Aug. 22, 1950     C. S. ROBINSON     2,519,702
DUPLEX SPRING ABSORPTION UNIT

Filed Sept. 24, 1946     2 Sheets-Sheet 1

INVENTOR
Cecil S. Robinson.
BY Robert V. Morse
ATTORNEY

Aug. 22, 1950     C. S. ROBINSON     2,519,702
DUPLEX SPRING ABSORPTION UNIT
Filed Sept. 24, 1946     2 Sheets-Sheet 2
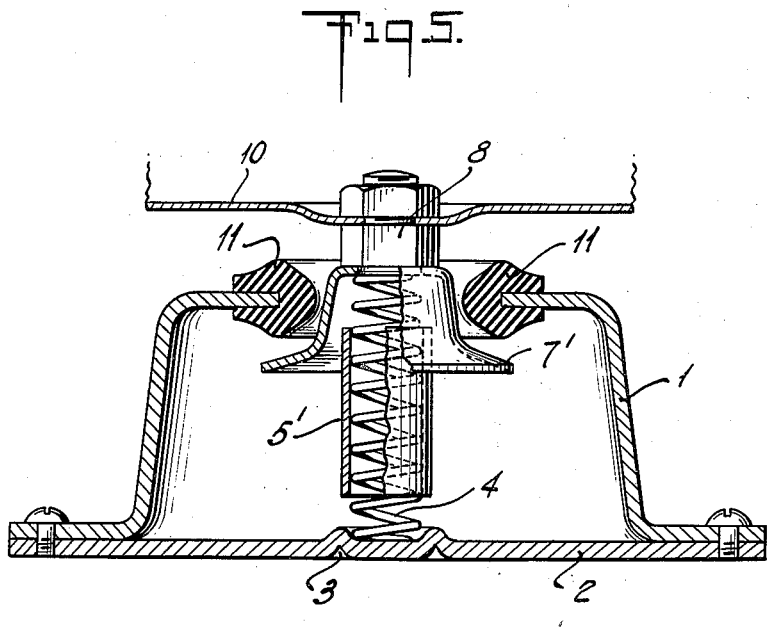
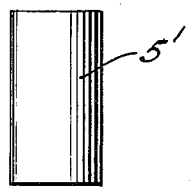
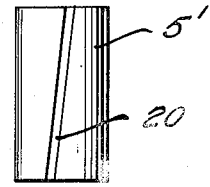
INVENTOR.
CECIL S. ROBINSON.
BY Robert V. Morse
ATTORNEY.

Patented Aug. 22, 1950

2,519,702

UNITED STATES PATENT OFFICE 2,519,702

DUPLEX SPRING ABSORPTION UNIT

Cecil S. Robinson, New York, N. Y.

Application September 24, 1946, Serial No. 699,011

7 Claims. (Cl. 248—358)

This invention relates to vibration absorption units such as are used in mounting objects to be protected from mechanical vibration. These units are of self-contained construction and one or more of them carry the load. They generally involve a high degree of engineering refinement in order to absorb both low and high frequency oscillation and to avoid resonance at critical frequencies. The objectionable vibrations often found in airplanes, cars, ships and factories fall generally into two types, continuous vibrations of small amplitude, often invisible to the eye, which by their prolonged effect tend to destroy delicate parts or induce metal fatigue; and second, the occasional shock, impact or momentary vibration of larger force or amplitude, such as may result for example from a power plant passing through a harmonic period in the acceleration, or from a sudden change in velocity. One difficulty in the construction of all vibration absorption apparatus is that a unit sufficiently responsive to absorb small vibrations may become unstable, gallop, or itself serve to create harmonic vibrations when exposed to impacts or vibrations of greater force.

The general object of the present invention is to provide an absorption unit of the metallic spring type having a dampener in direct contact with the surface of the spring to oppose the build-up of harmonic vibrations. Other objects are to provide for the control of momentary heavier vibrations or shocks, without impairing the ability of the unit to absorb the finer vibrations; and to operate laterally as well as vertically, so as to absorb vibrations from all directions. A further object is to produce self-contained complete units, each embodying the foregoing characteristics, which when used singly or more often in multiple at various points of support may stabilize and insulate the supported object from shocks and vibrations. The spring construction gives lightness, long life, freedom from drift or permanent set, and invulnerability to cold, heat or humidity. Various other objects will become apparent as the description proceeds.

Referring now to the drawings forming part of this specification, Fig. 1 is a cross-sectional view in elevation of one form of the device.

Fig. 5 is a cross-sectional view in elevation of a modified form of unit.

Fig. 6 is a detail view of an external frictional sleeve.

Fig. 7 is a detail view of an external frictional sleeve having a slot or gap, being an intermediate form between a helix and a cylinder.

Similar reference numerals refer to similar parts thruout the various views.

Figure 1:
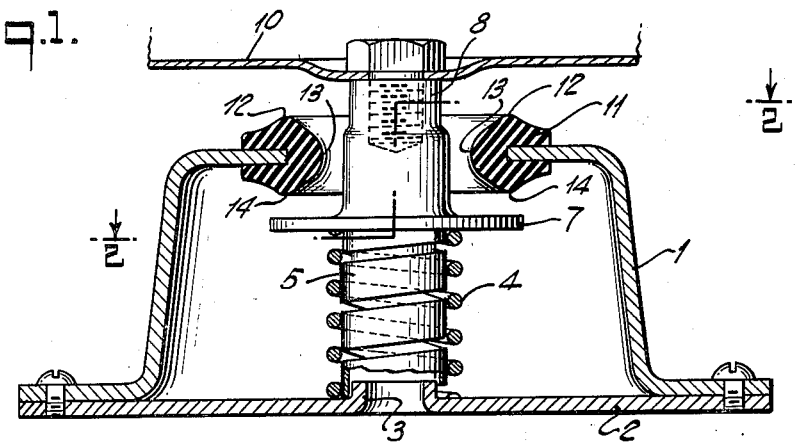
Figure 2:
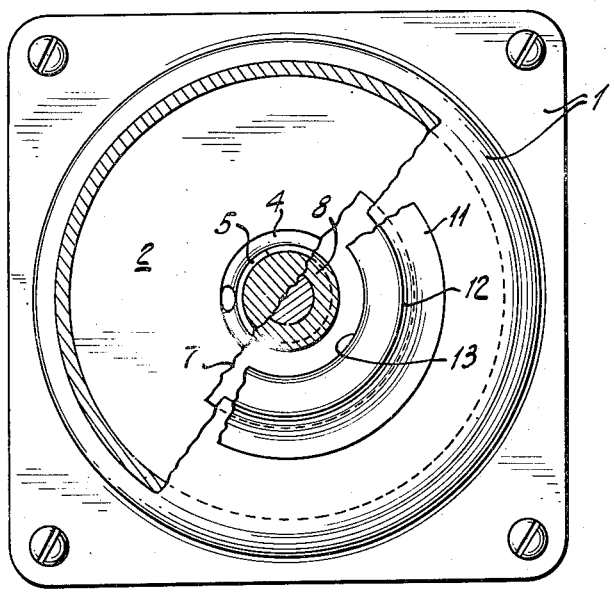
Fig. 2 is a plan view partly in cross-section taken on the line 2—2 of Fig. 1.

Referring first to the form shown in Fig. 1 and Fig. 2, the unit consists of a casing 1 having a base 2 which may either be detachably secured to the casing 1 by ordinary fastening means such as screws or bolts, or permanently secured by rivets or welding. In any event the device is not normally opened except for inspection or repair, or possibly to try out different sizes of springs. It may be sold as a packaged unit. The base 2 may be provided with a central hole whose rim 3 is turned in to provide a centering means for the spring 4 to be described.

Figure 3:
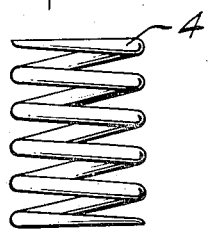
Fig. 3 is a detail view of the load carrying spring.

Referring now to Fig. 1 and Fig. 3, the principal spring 4 which carries the main load is a coil spring of the diameter and size having the general order of elasticity required by the range of action for which the unit is built. It is wound helically so as to have a generally cylindrical configuration. The spring is preferably made of stainless steel, beryllium copper, or other non-corrosive material suitable for springs, in order that it may be unaffected by climatic conditions. This spring 4 not only can move axially, but is also capable of a moderate amount of lateral movement, since it is fastened only at the bottom. This lateral movement is also limited by the general construction as will be described later. Such a spring as 4 is capable of operating in the three dimensions of space, that is, it has a three-way action in absorbing vibrations, as contrasted to the one-way action of an ordinary rubber unit of the shear type. The chief difficulty with a simple coil spring such as 4 is that at times its natural or harmonic period may accord with the external vibrations being received, in which case, instead of acting as an absorber, it may commence to amplify them, and gallop.

Figure 4:
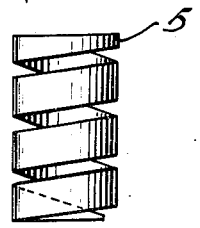
Fig. 4 is a detail view of the frictional dampener.

In the present invention any such tendency is counteracted by a secondary spring 5 having a different natural period and associated with the principal spring 4 in such a manner that differences in vibration introduce frictional or snubbing action between them, tending to immediately dissipate the incoming energy in the form of heat, though of course such heat is imperceptible to the casual observer. One preferred form of this secondary spring 5 is a ribbon of copper or other non-corrosive metal wound helically as a ribbon would wind around a cylinder with its broad face in the plane of the cylinder, as shown in Fig. 4, so that its exterior is somewhat like a cylinder having a helical slot. This gives a large superficial area and a moderate amount of axial elasticity with a natural period entirely different from the principal spring 4. Furthermore, the diameter of the spring 5 can be altered slightly by twisting it, and it is so designed that it fits snugly in light contact with the coils of the sprincipal spring 4, so that the springs 4 and 5 rub together slightly as they move under vibration. This friction, while not stiffening the spring action to any considerable extent, has a salutary effect in discouraging the build-up of harmonics, and is particularly desirable in small units where the dimensions of the case do not permit enough room for more elaborate snubbers. The two springs 4 and 5 may be coiled in the same direction or in opposite directions, one right hand and the other left hand. In any event the contacting surfaces are so different that they can rub without catching.

The load is applied to these springs 4 and 5 by a flange 7 on the stud 8 which is attached to the supported object 10. The stud or rod 8 passes thru a relatively large hole in the top of the case 1. In this hole is fitted a supplementary cushion consisting of an elastic grommet or collar 11, generally made of rubber, felt, or similar cushioning material, this grommet having an upper face 12, an inner face 13, and a lower face 14, each of which is rounded or tapered so that light contacts will touch a small amount of the material, and heavier contacts will engage increasing amounts. Under normal light load conditions the stud 8 does not touch the inner edge 13 of the grommet 11, nor does the load 10 touch the top face 12. Also the spring system is so designed that under normal conditions of vibration the top of the flange 7 does not strike the lower side 14 of the grommet 11.

However, when excessive lateral shocks or vibrations occur, the sides of the stud 8 engage the inner edge 13 of the cushion 11, and when excessive vertical or axial vibrations occur the upper and lower faces of the cushion 11 may come into action against the supported object 10 and the flange 7, so that the grommet or supplementing cushion 11 serves as a combined snubber and limit stop. Its tapered contour at each operating face adapts it to both light and heavy contacts, and its natural period is accordingly variable and of a quite different order than that of either of the springs 4 or 5. There is thus introduced a third factor for breaking up harmonics.

When the unit is not under any load, that is, as it is manufactured and shipped, the coil springs hold the flange 7 against the lower face 14 of the grommet 11; but when the usual load is applied the springs 4 and 5 are compressed sufficiently so that the flange 7 is out of contact with the grommet 11 when absorbing the normal vibrations.

Extensive tests have shown that the combination has very favorable characteristics for the absorption of vibrations, and an absence of the secondary harmonic peaks often found in rubber mounts of the shear type, which are particularly vulnerable to vibrations having a lateral component.

The functional control element which rubs on the principal spring 4 has been shown located inside the spring 4 in the form above described. The frictional control can also be arranged to rub on the outside of the spring 4 with a similar effect; also, instead of being helical, the frictional control may be a shorter tube or sleeve of equivalent diameter rubbing on the surface of the load carrying spring 4. Such a modification is shown in Fig. 5, in which the frictional snubbing element is slipped over the outside of the spring 4 so as to surround it and engage the outer surface of its coils.

Referring to Fig. 5 more in detail, the case 1, stud 8, and grommet 11 on the case 1 surrounding the stud 8 are similar to the corresponding parts in Fig. 1. The flange 7' of Fig. 5 is similar in function to the flange 7 of Fig. 1, though the flange 7' is dished instead of flat to provide greater compactness and assist in the rapid assembly and centering of the supporting spring 4. This spring 4 is a helical coil, the same as in Fig. 1, which carries the load and is capable of swaying laterally in all directions as well as moving vertically so as to provide a three-way adsorption of vibrations coming from all directions. Instead however of placing a frictional dampener inside the coils of the spring 4, a dampener 5' is slid over the outide of the spring 4, so as to be in frictional contact with the outer surfaces of the coils 4. This dampener 5' is in general cylindrical in form so as to correspond to the exterior of the spring 4, and in Fig. 5 is shown as a tube somewhat shorter than the spring 4 and enclosing its middle portion. This tube or shell 5' may be made of metal, plastic, or other suitable material, and is of such a diameter as to grip the spring 4, which can be inserted in assembly by twisting so as to slightly reduce the spring diameter, and then releasing it to engage the tube. The friction is such that the enclosed coils of the spring 4 move in the usual way under load but with enough frictional contact to dampen the build-up of harmonic vibrations.

The enclosing dampener 5' of Fig. 5 may be of various materials, including not only metals, but also the harder plastics, or other materials having similar mechanical characteristics. The tubular form may be either unbroken as in Fig. 6 or slotted as in Fig. 7. In Fig. 7 the slot 20 is practically straight, but it may have any desired inclination from vertical to a pronounced helix such as has the element 5 in Fig. 4. When not slotted, or with a slot too steep to permit action as a helical spring, the cylindrical friction area should be shorter than the spring 4 so as not to be crushed when the spring 4 is compressed under load. This shorter construction is usually advisable when non-metallic materials are used. With ordinary vibrations the friction on the spring has a relatively small dampening effect, as the motion of the dampener is somewhat in accord with the motion of the spring, but when the spring itself starts to build up harmonics the dampening effect is more pronounced, since the movement of the coils relative to the dampener is greater.

The combination herein described provides a very compact and durable unit with three-way characteristics and relatively high absorptive efficiency. The operating range of this type unit is sufficiently broad so that a wide variety of applications can be carried with relatively few sizes, particularly as they can be used in multiple, so that it is adapted to general manufacture as standardized equipment, and thereby reduce its cost to the user.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. In a vibration absorption mount, the combination of a load carrying stud, a flange on said stud, a helical spring supporting said flange and stud, a coaxial dampener in frictional contact with the supporting spring so that the helical portions of the spring rub on said dampener in action, a case surrounding the foregoing parts, said case having an opening thru which the stud projects, said opening being lined with an elastic grommet normally out of contact with the stud but capable of snubbing it when the spring is bent laterally, whereby harmonic vibrations in the spring are suppressed and a three-way vibration absorption obtained.

2. In a vibration absorption mount, the combination of a load carrying stud, a flange on said stud, a helical spring supporting said flange and stud, a coaxial dampener in frictional contact with the supporting spring so that the helical portions of the spring rub on said dampener in action, a case surrounding the foregoing parts, said case having an opening thru which the stud projects, said opening being lined with an elastic grommet normally out of contact with the stud but capable of snubbing it when the spring is bent laterally, said grommet also having upper and lower faces adapted to supplement the spring and act as limit stops under conditions of excessive vibration, whereby harmonic vibrations in the spring are suppressed and a three-way vibration absorption obtained.

3. In a vibration absorption mount, the combination of a case having a hole, a load carrying member extending loosely thru said hole, an elastic cushion on the edges of said hole, said cushion having upper, lower and inner operating sides, the inner side serving to limit lateral deflection of the load carrying member under excessive lateral impacts, the upper and lower sides of the cushion serving as vibration absorptive buffers and limit stops for excessive axial vibration of the load carrying member, a helical spring supporting said member, and a coaxial dampener in frictional contact with the supporting spring so that the helical portions of the spring rub on said dampener in action, whereby harmonic vibrations in the spring are suppressed and a three-way vibration absorption obtained.

4. In a vibration absorption mount, the combination of a case having a hole, a load carrying member extending loosely thru said hole, an elastic cushion on the edges of said hole, said cushion having upper, lower and inner operating sides, the inner side serving to limit lateral deflection of the load carrying member under excessive lateral impacts, the upper and lower sides of the cushion serving as vibration absorptive buffers and limit stops for excessive axial vibration of the load carrying member, a helical spring supporting said member, and a coaxial dampener in frictional contact with the supporting spring so that the helical portions of the spring rub on said dampener in action, coaxial dampener being shorter axially than the operating axial length of the supporting spring, so that a portion of the spring extends beyond the dampener, whereby harmonic vibrations in the spring are suppressed and a three-way vibration absorption obtained.

5. In a vibration absorption mount, the combination of a case having a hole, a load carrying member extending loosely thru said hole, an elastic cushion on the edges of said hole, said cushion having upper, lower and inner operating sides, the inner side serving to limit lateral deflection of the load carrying member under excessive lateral impacts, the upper and lower sides of the cushion serving as vibration absorptive buffers and limit stops for excessive axial vibration of the load carrying member, a helical spring supporting said member, and a coaxial dampener comprising a tubular enclosure in frictional contact with the supporting spring so that the helical portions of the spring rub on said dampener in action, coaxial dampener being shorter axially then the operating axial length of the supporting spring, so that a portion of the spring extends beyond the dampener, whereby harmonic vibrations in the spring are suppressed and a three-way vibration absorption obtained.

6. In a vibration absorption mount, the combination of a case having a hole, a load carrying member extending loosely thru said hole, an elastic cushion on the edges of said hole, said cushion having upper, lower and inner operating sides, the inner side serving to limit lateral deflection of the load carrying member under excessive lateral impacts, the upper and lower sides of the cushion serving as vibration absorptive buffers and limit stops for excessive axial vibration of the load carrying member, a helical spring supporting said member, and a coaxial dampener comprising a slotted tubular member in frictional contact with the supporting spring so that the helical portions of the spring rub on said dampener in action, coaxial dampener being shorter axially than the operating axial length of the supporting spring, so that a portion of the spring extends beyond the dampener, whereby harmonic vibrations in the spring are supressed and a three-way vibration absorption obtained.

7. In a vibration absorption device, the combination of a rigid casing having a hole, a load carrying stud loosely mounted in said hole, an elastic cushion between the stud and the sides of the hole, a flange on the stud within the casing, a helical spring supporting said flange and stud, and a sleeve supported by frictional contact with said spring and extending a portion of its length, said sleeve serving as a harmonic dampener on the spring and the spring and cushion serving as a three-way vibration absorption system.

CECIL S. ROBINSON.

REFERENCES CITED

The following references are of record in the file of this patent:

UNITED STATES PATENTS

| Number | Name | Date |
| --- | --- | --- |
| 1,515,346 | Kreissing | Nov. 11, 1924 |
| 1,952,102 | Sproul | Mar. 27, 1934 |
| 2,013,756 | Kalischer | Sept. 10, 1935 |
| 2,136,908 | Pierce et al. | Nov. 15, 1938 |
| 2,215,743 | Saurer | Sept. 24, 1940 |
| 2,425,565 | Robinson | Aug. 12, 1947 |